United States Patent [19]

Struger et al.

[11] 4,360,913
[45] Nov. 23, 1982

[54] MULTIPLEXING I/O MODULE

[75] Inventors: Odo J. Struger, Chagrin Falls; Ronald A. Brown, Willowick, both of Ohio

[73] Assignee: Allen-Bradley Company, Milwaukee, Wis.

[21] Appl. No.: 131,126

[22] Filed: Mar. 17, 1980

[51] Int. Cl.³ .............................................. H04J 6/00
[52] U.S. Cl. ..................................... 370/112; 375/36; 364/200; 364/900
[58] Field of Search ................ 375/36; 370/58, 66–68, 370/85, 89, 91, 112; 364/200 MS File, 900 MS File

[56] References Cited

U.S. PATENT DOCUMENTS

| 3,678,205 | 7/1972 | Cohen | 370/66 |
| 3,692,942 | 9/1972 | Inose | 370/91 |
| 3,705,267 | 12/1972 | Marino | 370/67 |
| 3,959,596 | 5/1976 | Bojanek | 370/67 |
| 4,040,028 | 8/1977 | Pauker | 364/200 |
| 4,160,126 | 7/1979 | Bojanek | 370/58 |
| 4,160,876 | 7/1979 | Bojanek | 370/58 |

Primary Examiner—Benedict V. Safourek
Assistant Examiner—Stephen Chin
Attorney, Agent, or Firm—Quarles & Brady

[57] ABSTRACT

A preferred embodiment of an input module is connected through six address terminals and four data terminals to six banks of contacts. A single bank address is coupled to two latches in the module and then to two banks of contacts. A nibble of data is coupled from each of two banks of contacts to each of two corresponding data latches on the module. The sequential addressing of a low nibble bank and a high nibble bank and the latching of data therefrom is controlled by sequencing circuitry which is enabled each time a bank address is written to the module. In a second embodiment coded information is output through the six address terminals and decoded by two external decoders to multiplex 256 inputs to the processor. Such modules are particularly useful in multiplexing a large number of inputs to the processor of a programmable controller.

11 Claims, 6 Drawing Figures

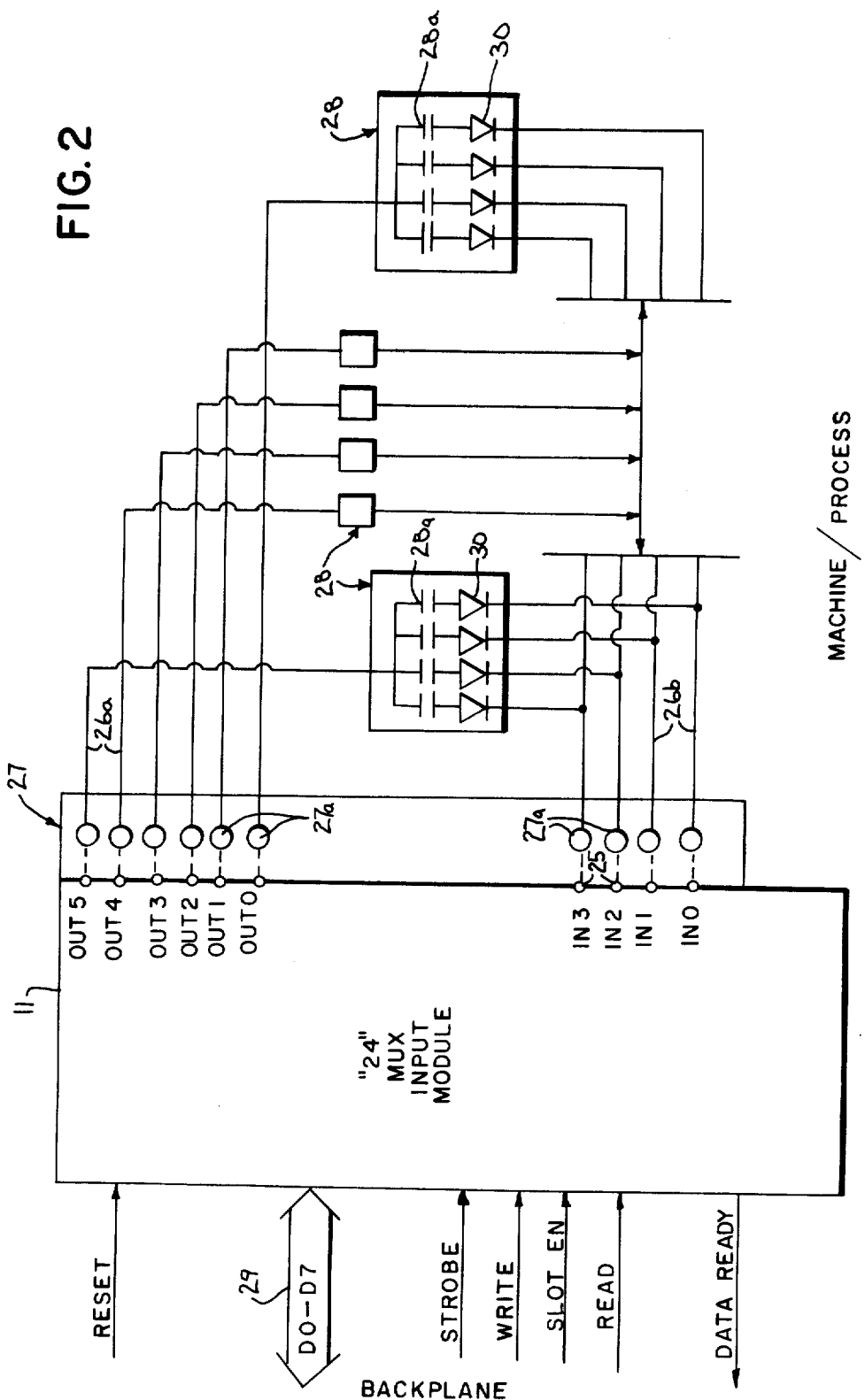

MULTIPLEXING I/O MODULE

BACKGROUND OF THE INVENTION

1. Field of the Invention

The field of the invention is digital controllers, and more particularly, programmable controllers that use I/O modules to couple I/O devices to a main processor.

2. Description of the Prior Art

Various forms of multiplexing are well known. Analog multiplexing circuit chips are widely used to perform a switching function, where individual analog input channels are connected in sequence to a single data input channel, as directed by coded channel select signals received at control inputs on the chip. Each analog signal is then converted to eight bits of parallel digital data, known as a byte, which is then coupled to a processor.

An example of multiplexing a large number of digital inputs is seen in FIG. 4 of LaRocca, et al, U.S. Pat. No. 4,047,003, issued Sept. 6, 1977. There bytes of data are coupled to an 8-bit data bus through sets of gates that are sequentially enabled by signals from a counter.

In both of the above examples it is assumed that the digital data channel is a minimum of eight bits (a byte) wide. This simple type of multiplexing is not sufficient for many programmable controller applications for two reasons. First, for high density multiplexing, the limited number of I/O data terminals must be used more efficiently to obtain more than a one-to-one ratio of I/O terminals to I/O devices. There is not the same amount of physical space available for external I/O module connections that is available when these connections are made internally on a module, and using eight I/O terminals on the machine/process side of the module uses most of the available I/O terminals. Second, if data is received in groups other than bytes, it must be assembled into data words of a size that are conveniently transferred to a main processor during an I/O scan. The above examples of the prior art do not show how to multiplex a large number of I/O devices through a limited number of I/O terminals to a processor that executes a periodic I/O scan routine.

SUMMARY OF THE INVENTION

The invention is embodied in an I/O module that performs external addressing of banks of I/O contacts in addition to coupling I/O data. The I/O module performs high density multiplexing with a minimum of logic circuitry and without its own processor.

In a preferred embodiment uncoded address information is used to multiplex 24 inputs on the machine/process side of the module to an 8-bit I/O data bus on the processor side of the module, while in a second embodiment 6-bit coded addresses are used to multiplex 256 inputs to the same 8-bit I/O data bus.

The module of the present invention more particularly includes a first latch for coupling a bank address on the I/O bus to the I/O module and a first set of gates for coupling this bank address through a set of address terminals to two I/O banks. The module also includes sequencing circuitry for generating signals in sequence to selected gates in the first set to couple the bank address to two I/O banks in succession. Two more latches are provided on the module for coupling data between the two I/O banks and two parallel portions of the I/O bus. The sequencing circuitry also generates clock signals to these two latches to couple a first group of data bits between one I/O bank and one latch, and to thereafter couple a second group of data bits between the other I/O bank and the other latch. A second set of gates is connected to the two data latches to complete the coupling of a multibit word of I/O data between the two groups of I/O devices and the I/O bus.

One object of the invention is to provide an I/O module with minimum circuitry to multiplex and demultiplex data associated with banks of contacts. The input module of the present invention is particularly well-suited to reading groups of thumbwheel switches, where each thumbwheel switch generates BCD coded inputs through four input lines. The module can also be used to couple binary inputs to the main processor of a digital controller.

Another object of the invention is to use certain of the terminals on an I/O connector as address terminals to provide a matrix of inputs or outputs.

Another object of the invention is to provide for high density multiplexing through addition of external address decoder means.

Another object of the invention is to couple data to a main processor from a multiplexing input module in response to the output of a single address, which is followed by the input of a byte of data assembled from two banks of contacts. This sequence requires a minimum of main processor time for updating an I/O image table in the main memory.

These and other objects and advantages of the invention will be apparent from the detailed description which follows. In the detailed description reference is made to the accompanying drawings which form a part hereof and in which there is shown by way of illustration a preferred embodiment and a second embodiment of the invention. Such embodiments do not, however, define the full scope of the invention which is reserved for the claims that follow the description.

BRIEF DESCRIPTION OF THE DRAWINGS

FIG. 2 is a block diagram of the I/O module of FIG. 1 as it would be connected to I/O devices;

DETAILED DESCRIPTION OF THE PREFERRED EMBODIMENT

Figure 1:
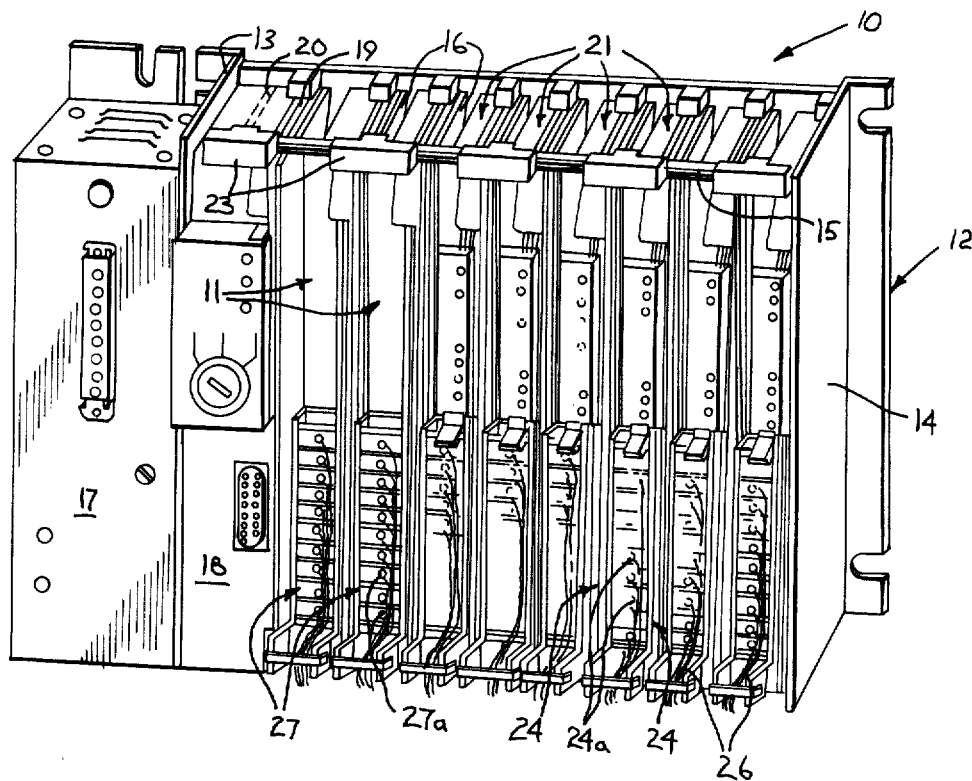
FIG. 1 is a perspective view of a programmable controller which incorporates an I/O module of the present invention.

Referring to FIG. 1, a programmable controller 10 which includes two multiplexing I/O modules 11 of the present invention is supported by a rack 12. The rack 12 has a pair of upright sidewalls 13, 14 which are connected by support rods, of which a front, upper support rod 15 is seen in FIG. 1. The interior of the rack is divided into a plurality of upright, closely spaced slots 16. A power supply 17 is mounted on the left sidewall 13 and a processor module 18 is removably inserted in the left-most slot of the rack 12. The processor module 18 includes a main processor (not seen) and a main memory (not seen) which are mounted on a fatherboard 19 and a daughterboard 20 (in phantom) included in the processor module 18.

The rack 12 has eight other slots which are designated I/O slots, and which hold the two multiplexing I/O modules 11 and six conventional I/O modules 21 that are electrically connected to the processor module 18 through a backplane motherboard 22 extending across the back of the rack 12. The conventional I/O modules 21 have sets of LED indicators along the upper portions of their front edges, and like the multiplexing I/O modules 11, are disposed in the I/O slots and held in place by latches 23 that are pivotally mounted across the front upper support rod 15. Upright, elongated swing-arm connectors 24 are pivotally mounted on a lower support rod that is not seen in FIG. 1. The swing-arm connectors 24 have screw-type terminals 24a which connect through the back of the connectors 24 to terminals 25 on the lower front edge of circuit boards, these terminals 25 being generally represented in FIGS. 2 and 4. The I/O modules 11 and 21 are connected to input and output devices (not seen) through wires 26 which connect to the screw terminals 24a on the front of the swing-arm connectors 24. Prior to this invention, it had been customary to connect each screw terminal to a single I/O device. For the conventional I/O modules 21 in the controller of FIG. 1, each swing-arm connector 24 includes ten terminals 24a, two being available for customer power supply connections and eight being available for connection to I/O devices.

To the right of the processor module 18 in FIG. 1 are two multiplexing I/O modules 11 of the present invention, each being connected by a twelve-terminal swing-arm connector 27 to banks of inputs 28 seen in FIG. 2. Referring to FIG. 2, each 24-input multiplexing I/O module 11 is connected to the processor module 18 through the backplane and through lines D0-D7 of an eight-bit I/O data bus 29. A plurality of control lines, including a RESET line, a STROBE line, a WRITE line, a SLOT ENABLE line, and a READ line are also connected to the input module 11 through the backplane to provide the necessary control signals for coupling data between the input module 11 and the processor module 18. For this particular input module 11, a DATA READY line is connected to the processor module 18 to send a signal to the main processor when data is present on the data bus 18 to be read by the main processor.

Still referring to FIG. 2, six output terminals 25 (OUT0-OUT5) on the front edge of the multiplexing input module 11 are connected through six terminals 27a of the swing-arm connector 27 to I/O bank addressing lines 26a. Each bank address line 26a is connected to a bank of four inputs 28, each input represented generally by a contact pair 28a, to enable the main processor to sense the status of these inputs 28a. The input module 11 also has four input terminals 25 (IN0-IN3) which are connected through four corresponding screw-type terminals 27a on the swing-arm connector 27 to four data lines 26b. Each bank of four inputs 28 is connected to these four data lines 26b so that when the bank 28 is addressed the status of the contacts 28a in the bank 28 can be sensed. Each pair of contacts 28a is connected in series with a diode 30 to an input line 26b to block the flow of current from contacts 28a in other banks 28 when their status is being sensed.

Each contact pair 28a represents any one of several input devices which can be used. The status of a matrix of push-buttons is conveniently sensed through the input module 11, and the organization of inputs in banks 28 is well-suited to reading status of thumbwheel switches that generate four digit binary-coded decimal (BCD) signals. The status of proximity, selector and limit switches could also be sensed. The banks of contacts 28 are sequentially addressed in response to backplane signals to read four bits or a nibble from each bank 28.

The main processor in the processor module 18 periodically executes an I/O scan routine in which a slot (actually an I/O module) 11 and 21 is addressed and enabled through the SLOT ENABLE line so that data can be input or output through the I/O data bus 29 according to the type of I/O module (input or output) in the slot. The main processor generates signals on the WRITE and STROBE lines when data is written to an output module and it generates a signal on the READ line when data is to be read from an input module. In the programmable controller seen in FIG. 1, the I/O modules 11 and 21 are grouped in pairs for addressing purposes. During the I/O scan each pair of I/O modules 11 and 21 is addressed and data is coupled through them to output devices if they are output modules. Then, the same two slots are addressed again to couple data from input devices to the main processor if the slots hold input modules. The I/O image table in the main memory is divided into an output image table and an input image table, both of which contain the address of each slot in the rack 12. This allows either an input module or an output module to be used in each slot without any special programming of the main processor.

Figure 3:
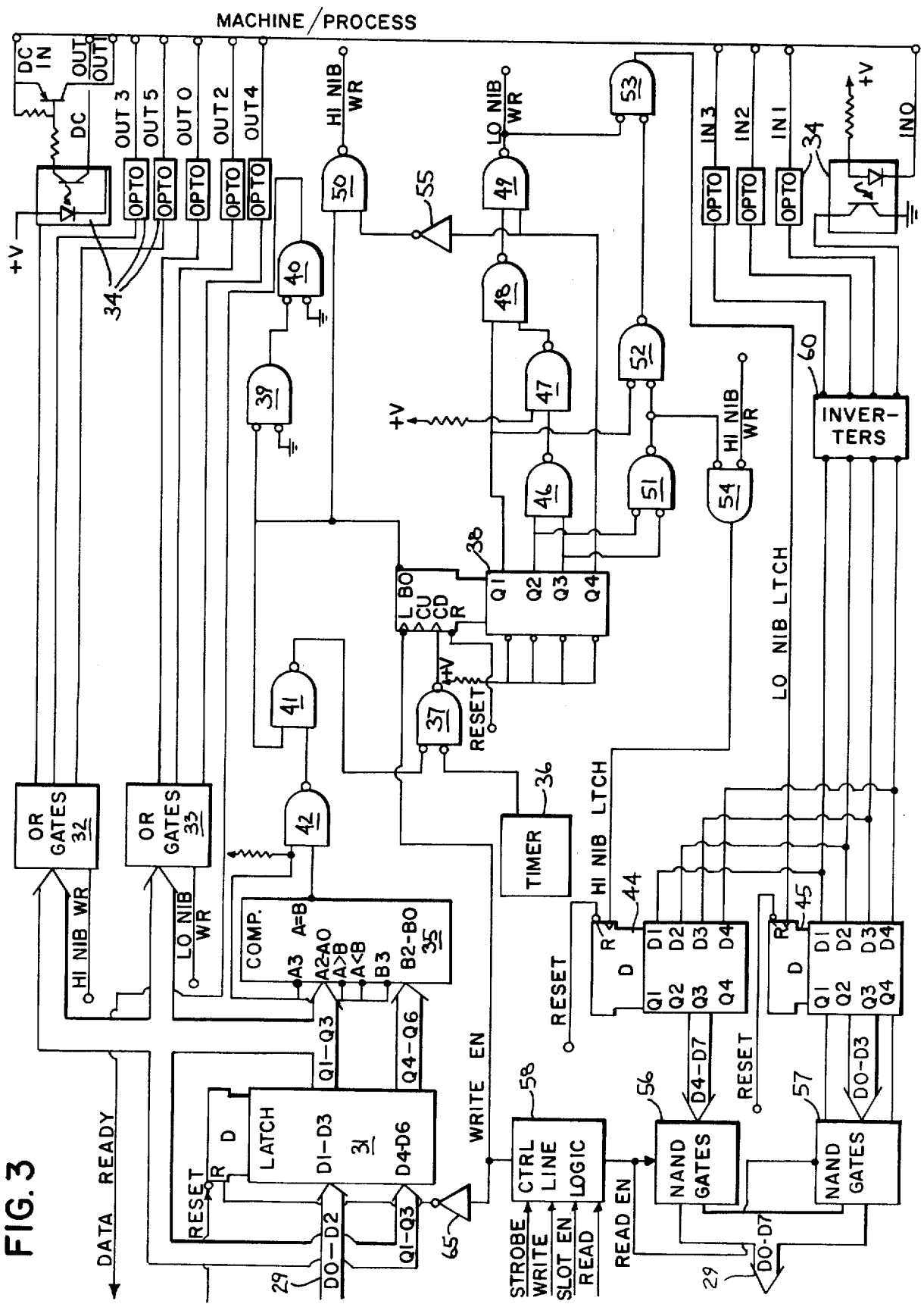
FIG. 3 is an electrical schematic diagram of the multiplexing input module of FIG. 2.

As seen in FIG. 3, to provide bank addressing to the multiplexing input module 11, lines D0-D2 of the data bus are coupled to inputs D1-D3 on a six-bit latch 31. Outputs Q1-Q3 on this latch 31 are connected to terminals OUT1, OUT3, and OUT5 through one set of low true OR gates 32 and to terminals OUT0 OUT2, and OUT4 through another set of low true OR gates 33. Terminals OUT0-OUT5 are connected through connectors 27 to corresponding banks of contacts 28 designated BANK0-BANK5. The following table provides the addresses (low true) which are received through lines D0-D2 to address pairs of these banks 28. A single address is coupled from the latch 31 to two banks 28 as shall be explained more fully below.

TABLE 1

| Address Bits | | | Selected Banks | |
|---|---|---|---|---|
| D0 | D1 | D2 | Low Nibble | High Nibble |
| 0 | 1 | 1 | BANK 0 | BANK 1 |
| 1 | 0 | 1 | BANK 2 | BANK 3 |
| 1 | 1 | 0 | BANK 4 | BANK 5 |

Optical coupling circuits 34 are connected between the OR gates 32 and 33 and the terminals 25 (OUT0-OUT5) to maintain electrical isolation between the I/O devices and the circuitry in the input module 11. Outputs Q1-Q3 on the latch 31 are also fed back to inputs D4-D6 so that output signals from outputs Q4-Q6 on the latch can be compared to signals from outputs Q1-Q3. These outputs Q1-Q6 are coupled through a four-bit comparator 35 which generates a disable signal at its A=B output to effectively disable the output of a timer 36.

The timer 36 is disabled when the comparator 35 determines that a bank address received through lines D0-D2 of the I/O data bus 29 is equal to the previous bank address received. For some processors with which the I/O module 11 is employed, the time between the addressing of two I/O banks 28 and the receipt of data on the I/O module 11 is longer than the time between write and read operations for a slot during the I/O scan sequence explained above. For these processors it is necessary to address I/O banks 28 during a first I/O scan cycle and read data during a second I/O scan cycle some time later. If data is ready on the module 11 for return to the processor module 18, as a result of a previous addressing operation, the subsequent addressing of the same I/O banks 28 will be ignored.

The timer 36 drives a sequencing logic circuit that generates HI NIB WR signals to couple bank addresses to I/O BANKS 1, 3 and 5 in a high nibble bank group, and LO NIB WR signals to couple bank addresses to BANKS 0, 2 and 4 in a low nibble bank group. To initiate a data input cycle the output of the timer 36 is coupled through a low true NOR gate 37 to a countdown (CD) input on a counter 38. The counter 38 is set to its highest value by a signal received at a latching (L) input and is decremented one count each time a signal is received at the CD input. When the counter 38 has counted down to zero and another pulse is received at the CD input, an output pulse is generated from a borrow (BO) output. The BO output on the counter 38 is connected through a pair of low true NOR gates 39 and 40 to a DATA READY line. A signal is generated on this line to tell the main processor that a byte of input data is now ready to be read at the end of the data coupling sequence between the input module 11 and the I/O devices. A disable signal is coupled from the BO output through a NAND gate 41 to one input on the low true NOR gate 37 to decouple the output signals of the timer 36 from the CD input until the counter is set to all 1's by the next signal to its L input. The NAND gate 41 also couples the disable signal from the A=B output on the comparator 35, which signal is coupled to NAND gate 42 through NAND gate 41.

Input data is received in four-bit groups (referred to as nibbles) through input lines IN0-IN3 which are connected through optical coupling (OPTO) circuits 34 and inverters 60 to a pair of data latches 44 and 45, one for receiving a high nibble (D4-D7) and the other for receiving a low nibble (D0-D3) to form a byte of I/O data. Data is clocked into the high nibble latch 44 through a high nibble latch enable (HI NIB LTCH) line. Similarly, data is clocked into the low nibble latch 45 when a signal is received through a low nibble latch enable (LO NIB LTCH) line, which is connected to a clock input on that latch.

The sequencing logic circuit includes five NAND gates 46-50, two low true AND gates 51 and 52, two low true NOR gates 53 and 54 and an inverter 55, the operation of which will be apparent to those skilled in the art from an examination of FIG. 3. These gates 46-55 are embodied in commercially available circuit chips, as are the other components described herein, and a listing of these chips is found in an Appendix at the end of this description.

The sequencing logic responds to signals from the counter 38 to generate four control signals: (1) a low nibble write (LO NIB WR) signal to address one of the low nibble banks of contacts (BANKS 0, 2 and 4); (2) a low nibble latch (LO NIB LTCH) signal to latch data from that bank 28 into the low nibble latch 45; (3) a high nibble write (HI NIB WR) signal to address one of the high nibble banks of contacts (BANKS 1, 3 and 5) and (4) a HI NIB LTCH signal to latch data from one of the high nibble banks 28 into the high nibble latch 44 on the input module 11.

Figure 6:
FIG. 6 is a timing diagram for the sequencing circuitry included in the modules of FIGS. 3 and 5.

Referring to FIG. 6, the timing diagram shows that the LO NIB WR line goes low first to select a first I/O bank 28, and then the LO NIB LTCH line goes high and then low to latch the data from that bank 28 into the low nibble latch 45. Next, the HI NIB WR line goes low to select a second bank of I/O devices, and then the HI NIB LTCH line goes high and then low to latch data from this bank 28 into the high nibble latch 44. The BO output generates a low signal to complete one I/O cycle and to signal the processor that a byte of data is ready in the latches 44 and 45. Data is then coupled to the processor module 18 through lines D0–D7 of the data bus when two sets of NAND gates, 56 and 57, each coupling a respective latch 44 and 45 to a respective parallel portion of the I/O data bus 29, are enabled by a signal through a READ ENABLE line connected to the respective sets of gates 56 and 57.

The STROBE, WRITE, SLOT ENABLE and READ control lines are coupled through a signal conditioning control line logic circuit 58 to generate output signals through a READ ENABLE line and a WRITE ENABLE line. The WRITE ENABLE line connects to the L input on the counter 38 and it also connects through an inverter 65 to a clock input on the bank address latch 31. Thus, when signals are received on the WRITE, STROBE and SLOT ENABLE lines, a signal is generated on the WRITE ENABLE line to latch the bank address into the latch 31 and to initiate the control sequence for coupling data between two I/O banks 28 and the input module 11. When signals are received through the READ and SLOT ENABLE lines, a signal is generated on the READ ENABLE line to enable the NAND gates 56 and 57 and couple a byte of data back to the main processor. The address and data latches 31, 44 and 45 can be reset through the RESET line which is connected to an R input on each of the latches.

Figure 4:
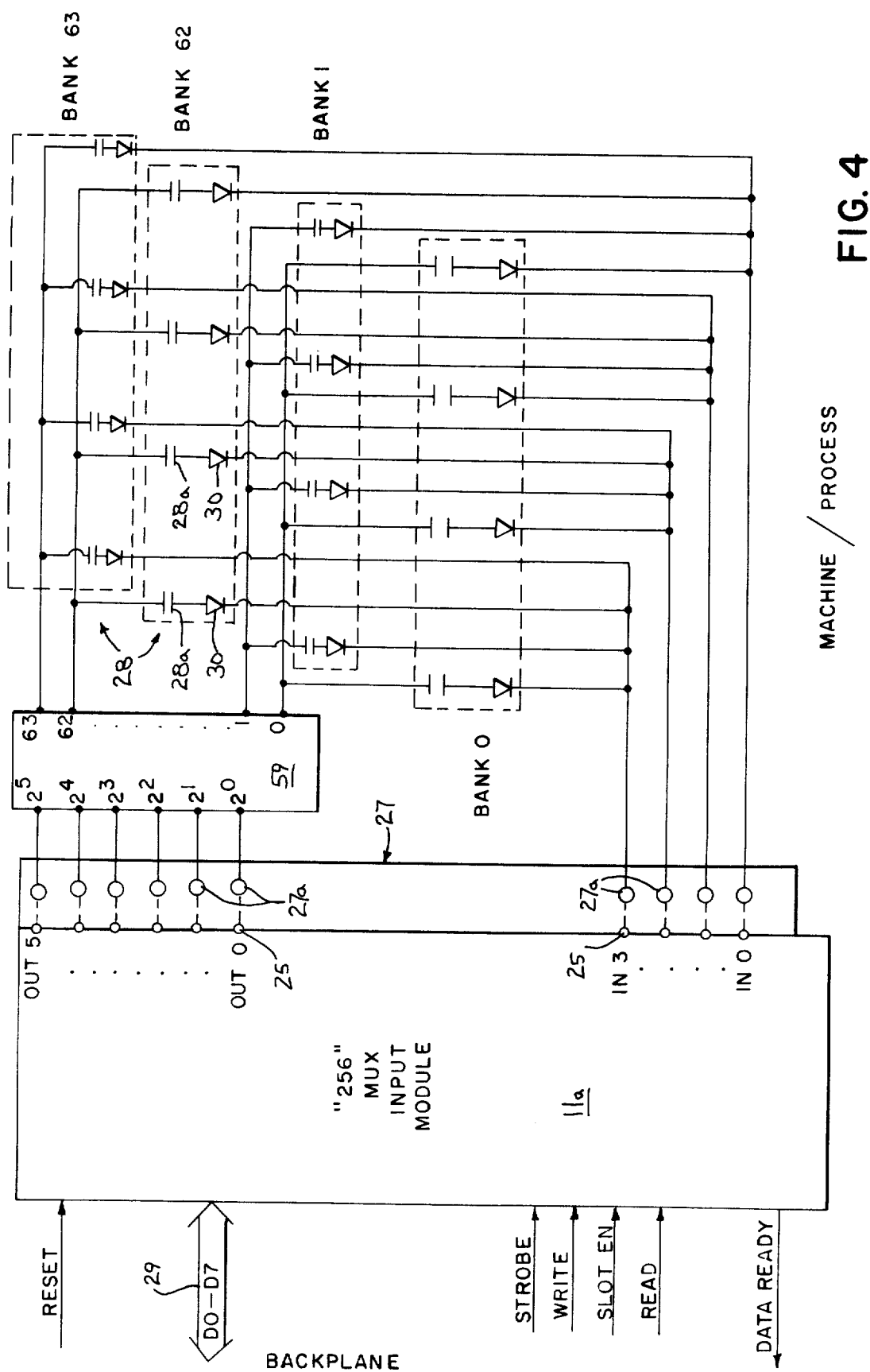
FIG. 4 is a block diagram of a second embodiment of the I/O module of FIG. 1, which utilizes an external decoder.
Figure 5:
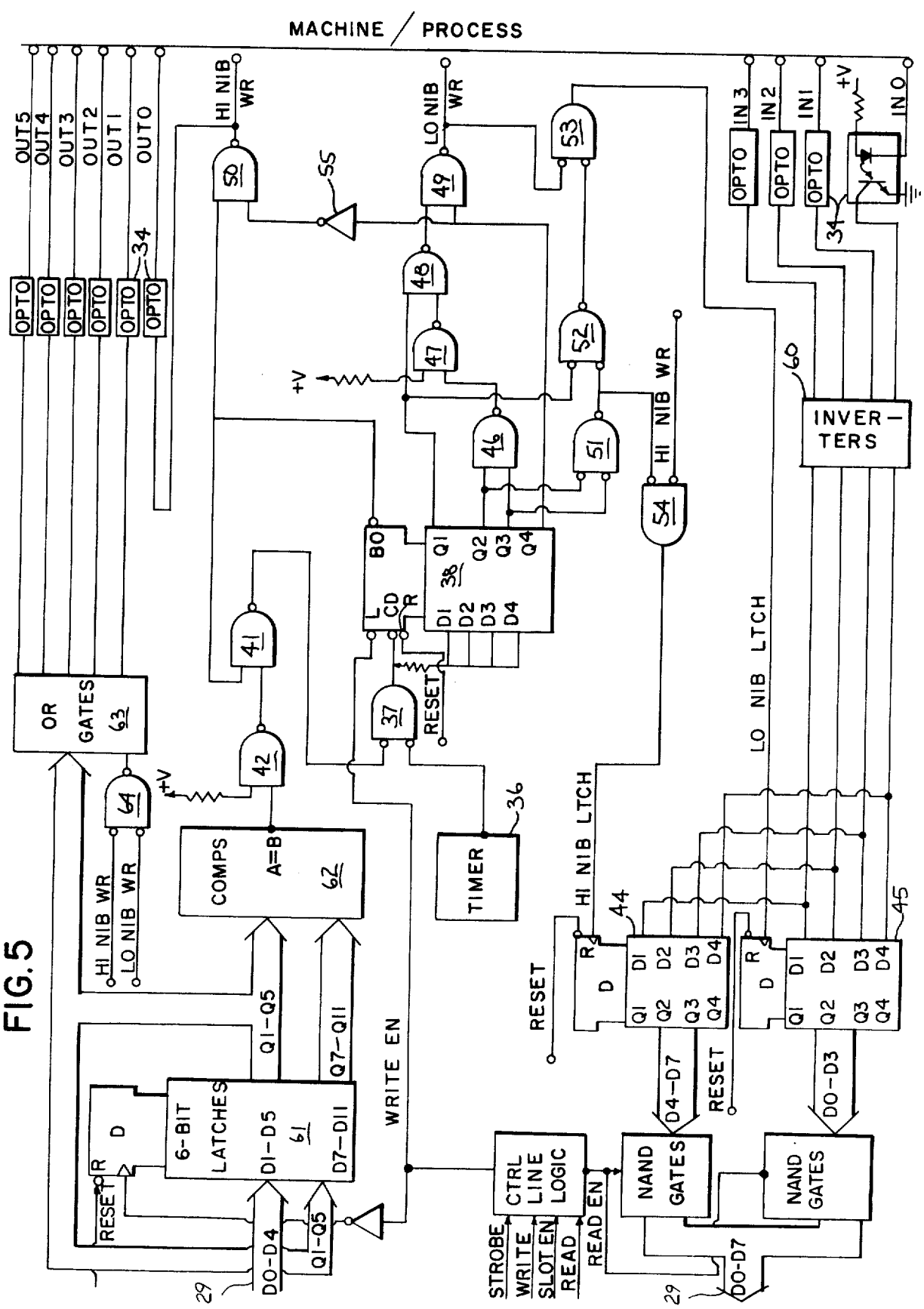
FIG. 5 is an electrical schematic diagram of the multiplexing I/O module of FIG. 4.

Referring to FIG. 4, the concept embodied in the input module 11 of FIG. 2 can be expanded through the addition of two 3-line-to-8-line external decoders 59, which have six inputs coupled through connector 27 to output terminals OUT0–OUT5 on a "256" multiplexing input module 11a. This combination treats bank address information as coded information rather than simply as enabling signals, and decodes this data to enable sixty-four banks of contacts, each bank 28 being connected to one of sixty-four outputs on the decoders 59. Referring to FIG. 5, the "256" multiplexing input module has lines D0–D4 of the data bus 29 connected to inputs D1–D5 on the first of two six bit latches 61. Outputs Q1–Q5 are connected back to inputs D7–D11 on the second of the two six bit latches 61. Outputs Q1–Q5 and Q7–Q11 of the latches 61 are connected to a pair of four-bit comparators 62 which have been cascaded to compare to five-bit inputs. The bank select addresses are coupled through lines Q1–Q5, a set of five AND gates 63 and five of the optical coupling circuits 34 to outputs OUT1–OUT5. The HI NIB WR line is connected through another optical coupling circuit 34 to the low order output, OUT0, to toggle this bit as first the low nibble bank 28 is selected, and then the high nibble bank 28 is selected. The HI NIB WR line and the LO NIB WR line are coupled through a low true OR gate 64 to an enable input on each of the OR gates 63 to enable the upper five outputs, OUT1–OUT5, when either a high bank or a low bank is selected. In this way each of thirty-two bank select addresses received through lines D0–D4 of the data bus 29 will address two banks of contacts 28 to input a byte of data. The assembling of two nibbles of data to form the byte of data is accomplished in the same manner as in the preferred embodiment of FIGS. 2 and 3.

The multiplexing/demultiplexing concept embodied in the two examples of the invention provides high density multiplexing of digital inputs and outputs through edge connectors 27 that have a relatively small number of terminals 27a. Multiplexing I/O modules of this type are particularly useful in small programmable controllers, and are particularly useful in sensing the status of pushbuttons and thumbwheel switches.

APPENDIX

Components List

| Item | Reference No. | Description |
|---|---|---|
| Latches | 31,61 | Three SN74LS174 hex D-type flip-flops |
| Comparators | 35,62 | Two SN74L85 4-bit magnitude comparators |
| OR Gates | 32,33,51,52,63,64 | Two SN74LS32 quad 2-input OR gates |
| Latches | 44,45 | Two SN74LS175 quad D-type flip-flops |
| Timer | 36 | One LM555 oscillator manufactured by National Semiconductor Corp. |
| Counter | 38 | SN74LS193 synchronous up/down dual clock counter |
| Optical Coupling Circuit | 34 | Ten TIL 111 optically coupled isolators for each of the modules seen in FIGS. 3 and 5, manufactured by Fairchild Camera and Instrument Corp. |
| NAND Gates | 41,42,46–50 | Two SN74LS00 quad 2-input NAND gates |
| NOR Gates | 37,39,40,54 | Two SN74LS02 quad 2-input NOR gates |
| NAND Gates | 56,57 | Two SN74LS38 quad 2-input positive NAND buffers with open collector outputs |
| Control Line Logic Circuit | 58 | Two SN74LS33 quad 2-input NOR buffers with open collector outputs |
| Decoders | 59 | Two SN74LS138 3-to-8-line decoders |
| Inverters | 55,65,60 | One SN74LS04 hex inverter |

All items are manufactured by Texas Instruments, Inc., unless otherwise specified.

We claim:

1. An I/O module adapted for connection between an I/O bus and a plurality of I/O devices and responsive to control signals from a main processor for coupling address signals from the I/O bus to first and second I/O devices in succession to multiplex or demultiplex two respective groups of I/O data bit signals that are coupled between the I/O devices and the I/O module and to couple these I/O data bit signals through the I/O bus during a single word transmission time in a multibit word of I/O data signals formed of the two groups of I/O data bit signals, the I/O module comprising:
   first means responsive to a first control signal from the main processor for coupling the I/O address signals received from the main processor through the I/O bus to first and second I/O devices in succession;
   second means for temporarily storing I/O data bit signals on the I/O module;
   third means responsive to the first control signal from the main processor for coupling the first group of I/O data bit signals between the first I/O device and the second means, and for then coupling a second group of I/O data bit signals between the second I/O device and the second means; and
   fourth means connected to the third means and responsive to a second control signal from the main processor to couple the multibit word of I/O data signals between the second means and the I/O bus during the single word transmission time, wherein the multibit word of I/O data signals is formed of the first group of I/O data bit signals and the second group of I/O data bit signals.

2. The I/O module of claim 1, wherein the I/O module has a set of terminals for connection to the I/O devices, and wherein the terminals are divided into a group of n address terminals included in the first means and a group of m data terminals included in the third means to couple an n×m number of I/O data signals between the I/O module and the I/O devices, where n and m are numbers greater than one.

3. The I/O module of claim 2, wherein:
   the first means receives binary-coded I/O address signals from the I/O bus and is thereafter responsive to couple the binary-coded address signals twice in succession to the address terminals; and
   further comprising external decoder means for connection between the address terminals and $2^n$ banks of I/O devices to couple decoded address signals to the banks of I/O devices, so that a $2^n \times m$ number of I/O data signals can be coupled between the I/O devices and the I/O bus.

4. The I/O module of claim 1, which is adapted to be coupled to a first bank of single-bit I/O devices and a second bank of single-bit I/O devices, wherein the first means is responsive for coupling I/O addresses to the first and second banks in succession and wherein the third means is responsive for coupling the first group of I/O data bit signals between the first bank of I/O devices and the second means, and for thereafter coupling the second group of I/O data bit signals between the second bank of I/O devices and the second means.

5. An I/O module responsive to control signals from a main processor to couple an address bit pattern from an I/O bus to two I/O devices in succession to multiplex or demultiplex I/O data which is coupled in two respective groups of data bits between the I/O devices and the I/O module and which is coupled through the I/O bus during a single transmission time in a word formed of the two groups of data bits, the I/O module comprising:
   first means for coupling the address bit pattern from the I/O bus to the I/O module;
   second means for coupling the address bit pattern from the I/O module to the two I/O devices;

third means responsive to the first control signal for generating signals in sequence to the second means to couple the address bit pattern to the two I/O devices in succession;

fourth means for temporarily storing data that is coupled between the first I/O device and a first portion of the I/O bus;

fifth means for temporarily storing data that is coupled between the second I/O device and a second portion of the I/O bus that is parallel to the first portion;

sixth means for generating clock signals to the fourth and fifth means to couple a first group of data bits between the first I/O device and the fourth means, and to thereafter couple the second group of data bits between the second I/O device and the fifth means; and seventh means connected to the fourth and fifth means and responsive to the second control signal to couple data for the two I/O devices between the fourth and fifth means and the first and second parallel portions of the I/O bus.

6. The I/O module of claim 3, wherein the I/O module has a set of terminals for connection to the I/O devices, and wherein the terminals are divided into a group of n address terminals included in the first and third means and a group of m data terminals included in the sixth means to couple an n×m number of I/O data signals between the I/O module and the I/O devices, where n and m are numbers greater than one.

7. The I/O module of claim 6, wherein:

the first means receives binary-coded address signals from the I/O bus and is thereafter responsive to couple the binary-coded addresses twice to the address terminals included in the first means;

wherein the third means couples a binary-coded bit to one address terminal for each binary-coded address coupled to the address terminals in the first means; and further comprising external decoder means for connection between the address terminals and $2^n$ I/O devices to couple decoded address signals to the I/O devices, so that a $2^n \times m$ number of I/O data signals can be coupled between the I/O devices and the I/O bus.

8. The I/O module of claim 5, which includes less than eight data terminals, and which includes connections for an I/O bus that is at least eight bits wide.

9. In a programmable controller having a main processor, a connector with I/O terminals for connecting a plurality of input devices to the controller, and an input module for coupling signals from the connector to the main processor through an I/O bus in response to read and write signals from the main processor, the improvement of a multiplexing input module which comprises:

first latch means coupled to the I/O bus for receiving addresses for groups of inputs, wherein each group of inputs forms an I/O bank;

first gate means for generating a pair of addresses through a set of address terminals on the connector, where each terminal is adapted to be connected to a respective I/O bank;

second latch means for coupling data from one I/O bank to one portion of the I/O bus through a set of data terminals on the connector;

third latch means for coupling data from a second I/O bank to another portion of the I/O bus, which is parallel to its first portion, through the set of data terminals on the connector;

enabling means responsive to a write signal from the main processor for generating enabling signals to selected portions of the first gate means to couple the pair of addresses to two respective I/O banks in sequence;

means for generating clock signals to the second and third latch means to couple a first bit group of input data from the first I/O bank to the second latch means, and to thereafter couple a second bit group of input data from the second I/O bank to the third latch means; and second gate means connected to the second and third latch means and responsive to a read signal from the main processor to couple a byte of data from the second and third latch means to the I/O bus.

10. The I/O module of claim 9, wherein the I/O module has a set of terminals for connection to the I/O devices, and wherein the terminals are divided into a group of n address terminals coupled to the first gate means and a group of m data terminals coupled to the second and third latch means to couple an n×m number of data bits between the I/O module and the I/O devices.

11. The I/O module of claim 10, wherein:

the first gate means is responsive to receive binary-coded addresses from the I/O bus and is further responsive to signals from the enabling means to couple a pair of binary-coded addresses to two respective I/O banks in sequence; and further comprising external decoder means for connection between the n address terminals and $2^n$ I/O banks to couple decoded addresses to the I/O banks, so that a $2^n \times m$ number of input data bits can be coupled between the I/O banks and the I/O bus.

* * * * *

UNITED STATES PATENT AND TRADEMARK OFFICE
CERTIFICATE OF CORRECTION

PATENT NO. : 4,360,913

DATED : November 23, 1982

INVENTOR(S) : Odo J. Struger et al

It is certified that error appears in the above—identified patent and that said Letters Patent is hereby corrected as shown below:

In claim 6 at column 9, line 23 "claim 3" should read --claim 5--.

Signed and Sealed this

Fifteenth Day of February 1983

[SEAL]

Attest:

GERALD J. MOSSINGHOFF

Attesting Officer

Commissioner of Patents and Trademarks